US008632705B2

(12) United States Patent
Jankowiak et al.

(10) Patent No.: US 8,632,705 B2
(45) Date of Patent: Jan. 21, 2014

(54) METHOD FOR PREPARING A POROUS NUCLEAR FUEL BASED ON AT LEAST ONE MINOR ACTINIDE

(75) Inventors: Aurélien Jankowiak, Limours en Hurepoix (FR); Nathalie Herlet, Saint Laurent de Carnols (FR); Caroline Leorier, Les Angles (FR); Nicolas Astier, Pont Saint Esprit (FR); Philippe Coste, Saint Paulet de Caisson (FR); Barbara Deschamps, Lapalud (FR); Damien Prieur, Roquemaure (FR); Philippe Blanchart, Limoges (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 68 days.

(21) Appl. No.: 13/393,375

(22) PCT Filed: Sep. 1, 2010

(86) PCT No.: PCT/EP2010/062806
§ 371 (c)(1),
(2), (4) Date: May 14, 2012

(87) PCT Pub. No.: WO2011/026862
PCT Pub. Date: Mar. 10, 2011

(65) Prior Publication Data
US 2012/0228788 A1    Sep. 13, 2012

(30) Foreign Application Priority Data
Sep. 2, 2009 (FR) .................................... 09 55985

(51) Int. Cl.
*G21C 3/62* (2006.01)
*G21C 21/02* (2006.01)
(52) U.S. Cl.
USPC ............. 264/0.5; 252/643; 423/260; 423/261

(58) Field of Classification Search
None
See application file for complete search history.

(56) References Cited

U.S. PATENT DOCUMENTS

| 4,460,522 | A  | * | 7/1984  | Kinugasa et al. | ............... | 264/0.5 |
| 4,889,663 | A  | * | 12/1989 | Michel | .............................. | 264/5 |
| 6,251,309 | B1 |   | 6/2001  | Song et al. | | |
| 6,251,310 | B1 | * | 6/2001  | Song et al. | ..................... | 264/0.5 |
| 7,169,370 | B2 | * | 1/2007  | Mesmin et al. | ................... | 423/3 |
| 2004/0201003 | A1 | | 10/2004 | Gotta et al. | .................... | 252/643 |
| 2007/0284766 | A1 | * | 12/2007 | Feugier et al. | ................. | 264/0.5 |
| 2008/0185743 | A1 | | 8/2008  | Yang et al. | | |

FOREIGN PATENT DOCUMENTS

FR   2 909 479 A1   6/2008
GB   1 599 857 A   10/1981

OTHER PUBLICATIONS

International Search Report and Written Opinions issued for International Application No. PCT/EP2010/062806.
International Preliminary Examination Report issued on Aug. 29, 2011 for International Application No. PCT/EP2010/062806.
Demand submitted on Jun. 21, 21011 for International Application No. PCT/EP2010/062806.
INPI, Search Report, dated Apr. 28, 2010, for French Application No. FR 0955985 (in French).

* cited by examiner

*Primary Examiner* — Mary F Theisen
(74) *Attorney, Agent, or Firm* — Knobbe, Martens, Olson & Bear LLP

(57) ABSTRACT

A method for manufacturing a porous fuel comprising uranium, optionally plutonium and at least one minor actinide is provided. The method may comprise the following successive steps: a) a step for compacting as pellets a mixture of powders comprising uranium oxide, optionally plutonium oxide and at least one oxide of a minor actinide, at least one portion of the uranium oxide being in the form of triuranium octaoxide $U_3O_8$, the other portion being in the form of uranium dioxide $UO_2$; b) a step for reducing at least one portion of the triuranium octaoxide $U_3O_8$ into uranium dioxide $UO_2$.

20 Claims, 2 Drawing Sheets

METHOD FOR PREPARING A POROUS NUCLEAR FUEL BASED ON AT LEAST ONE MINOR ACTINIDE

RELATED APPLICATIONS

This application is a U.S. National Phase of International Application No. PCT/EP2010/062806, filed Sep. 1, 2010, designating the U.S., and published in French as WO 2011/026862 on Mar. 10, 2011 which claims the benefit of French Patent Application No. 09 55985 filed Sep. 2, 2009.

TECHNICAL FIELD

The invention relates to a method for preparing a porous nuclear fuel comprising uranium, optionally plutonium and at least one minor actinide, applying steps involving powders of these elements.

This method may in particular find its application in the recycling of minor actinides via the incorporation of these minor actinides in the aforementioned fuel, which is intended to be used for forming nuclear rods for a nuclear reactor or further, to enter the composition of transmutation targets, in order to carry out nuclear transmutation experiments notably for better understanding the transmutation mechanism of these minor actinide elements.

It is specified, for the following discussion, that by minor actinide is meant actinide elements other than uranium, plutonium and thorium, formed in the reactors by successive captures of neutrons by the standard fuel nuclei, the minor actinides being americium, curium and neptunium.

BACKGROUND

At the present time, recycling of minor actinides stemming from the processing of used fuels is performed via two distinct routes known under the following names:
heterogeneous recycling; and
homogeneous recycling.

In the case of heterogeneous recycling, the minor actinides during the processing of the used fuel are separated from uranium and plutonium and are then incorporated at a high content in fuel elements comprising a non-fissile matrix distinct from the standard fuel elements of the reactor. The fuel elements comprising the minor actinides may for example consist in covering elements positioned at the periphery of the core of a reactor. This recycling route notably gives the possibility of avoiding degradation of the characteristics of the standard fuel by incorporation of minor actinides while focussing on the problems generated by these actinides on a reduced material flow.

In the case of homogeneous recycling, the minor actinides are mixed at a low content, and are distributed quasi-uniformly in the totality of the standard fuel elements of the reactor. To do this, during the processing of the used fuel, the uranium, plutonium and minor actinides are processed together in order to form oxides, which are then used in the manufacturing of said fuels.

The introduction of minor actinides in fuels intended for the reactor core is expressed by significant emission of fission gases within these fuels, and by strong alpha emission. For safety reasons, provision must therefore be made for fuels having a microstructure including a stable porosity level under irradiation, which moreover allows discharge of the fission gases and of the decay helium without any physical degradation of the fuel. The recommended porosity level for such fuels should be of the order of 14 to 16%, just as the porosity should be an open porosity.

In order to try and approach or even reach such a level, it is known how to incorporate into the fuel, significant amounts of organic blowing agents during the mixing/milling step for the aforementioned oxides. However, the durability over time of the organic blowing agents is not ensured considering the high alpha emission level generated by the presence of minor actinides. Indeed, the blowing agents presently used (such as azodicarbonamide) lose their properties very rapidly, which may generate a significant scrap rate which is difficult to manage because of the presence of minor actinides. The result of this is an impossibility of storing the mixtures intended to form the fuels and because of the degradation of the blowing agents, there is a risk of swelling of the fuel pellets before sintering, intended to enter the composition of the fuel. Consequently the result is an impossibility of obtaining fuels having controlled porosity.

Thus, considering the methods of the prior art relating to the manufacturing of fuel comprising minor actinides, the inventors set the goal of developing a method which does not have the drawbacks inherent to the use of organic blowing agents, i.e. degradation of these agents as soon as the stage for mixing precursors of the fuel and therefore impossibility of obtaining controlled porosity of the fuel.

DESCRIPTION OF CERTAIN INVENTIVE ASPECTS

In order to solve this problem, the inventors propose an inventive method with which it is possible to do without the use of organic blowing agents in order to obtain a porous nuclear fuel based on minor actinides.

The invention thus relates to a method for manufacturing a porous fuel comprising uranium, optionally plutonium and at least one minor actinide successively comprising the following steps:

a) a step for compacting as pellets a mixture of powders comprising uranium oxide, optionally plutonium oxide, and at least one oxide of a minor actinide, at least one portion of the uranium oxide being in the form of triuranium octaoxide $U_3O_8$, the other portion being in the form of uranium dioxide $UO_2$;

b) a step for reducing at least one portion of the triuranium octaoxide $U_3O_8$ into uranium dioxide $UO_2$.

This method is innovative, inter alia, by the fact that the porosity is generated by the reduction of triuranium octaoxide $U_3O_8$ into uranium dioxide $UO_2$. Indeed, reduction of triuranium octaoxide $U_3O_8$ into uranium dioxide $UO_2$ generates a reduction in the volume of the space occupied by the triuranium octaoxide by about 30%, the thereby left vacant space forming pores in the fuel. By adjusting the amount of triuranium octaoxide $U_3O_8$ in the initial mixture and the reduction level, it is thereby easily possible to target a specific porosity level of the fuel and to thereby access a method with which the porosity level of the produced fuel may be controlled.

Moreover, because of the absence of use of organic blowing agents, the difficulties related to the storage of precursor mixtures of the fuel or of the fuel pellets before sintering are smaller. The method of the invention therefore proves to be more flexible than the methods of the prior art applying organic blowing agents, since the different steps which make it up, may be carried out extemporaneously.

Finally, this method gives the possibility of considering incorporation of all the minor actinides (americium, curium and neptunium), stemming from the flows for reprocessing used fuels.

The oxide of a minor actinide may be americium oxide, such as $AmO_2$, $Am_2O_3$, curium oxide, such as $CmO_2$, $Cm_2O_3$, neptunium oxide such as $NpO_2$ and mixtures thereof.

The plutonium oxide may appear as $PuO_2$ and/or $Pu_2O_3$.

In the aforementioned mixture of powders, uranium oxide in the form of triuranium octaoxide $U_3O_8$ may be found associated with an oxide of a minor actinide within the same grains and optionally with plutonium oxide, said grains advantageously having a grain size of more than 100 μm, preferably ranging from 100 to 250 μm. This does not exclude the fact that the oxide of a minor actinide and the plutonium oxide may also exist as distinct grains.

It is specified that in the foregoing and in the following, by grain or powder having a grain size of more than 100 μm, is meant a powder which, deposited on a sieve having square meshes with a side of 100 μm, will not pass through said sieve.

It is specified that, in the foregoing and in the following, by grain or powder having a grain size ranging from 100 to 250 μm is meant a powder which may be selected by the following sifting operations:
   a first sifting operation with a sieve having square meshes with a side of 100 μm allowing isolation of the grain fraction which does not pass through said sieve, i.e. the powder having a grain size of more than 100 μm;
   a second sifting operation consisting of having said powder having a grain size of more than 100 μm stemming from the first sifting operation, pass over a sieve having square meshes with a side of 250 μm, the grain fraction having crossed the sieve making up the powder having a grain size ranging from 100 to 250 μm.

Prior to the compaction step a), the method of the invention may comprise a step for preparing the aforementioned mixture of powders in step a).

The step for preparing the mixture may according to the invention be carried out according to several alternatives.

According to a first alternative, the step for preparing the mixture of powders as defined in step a) may consist of putting into contact a first mixture comprising a uranium oxide powder in the form of uranium dioxide $UO_2$, optionally a plutonium oxide powder, and at least one powder of an oxide of a minor actinide and a second mixture of powders comprising uranium oxide in the form of triuranium octaoxide $U_3O_8$, optionally plutonium oxide and an oxide of a minor actinide, the second mixture of powders advantageously appearing as grains comprising the association within a same grain, of uranium oxide in the form of triuranium octaoxide $U_3O_8$, optionally of plutonium oxide and of an oxide of a minor actinide, said grains advantageously having a grain size of more than 100 μm, preferably ranging from 100 to 250 μm.

The first mixture may stem from the following operations:
   an operation for putting into contact a powder of uranium oxide in the form of uranium dioxide $UO_2$, optionally a plutonium oxide powder and at least one powder of an oxide of a minor actinide; and
   optionally, an operation for co-milling the resulting mixture in order to obtain an intimate mixture of powders.

The second mixture may stem from the following successive operations:
   an operation for putting into contact a powder of uranium oxide in the form of triuranium octaoxide $U_3O_8$, optionally a plutonium oxide powder, and at least one powder of an oxide of a minor actinide;
   an operation for co-milling said powders;
   a pressing operation at a predetermined pressure P1;
   a crushing operation; and
   at least one sifting operation so as to isolate the grains having a grain size of more than 100 μm, preferably ranging from 100 to 250 μm.

According to a second alternative, the preparation step may consist of putting into contact a first co-precipitated powder of uranium optionally plutonium oxide, and a minor actinide oxide with a second mixture of powders comprising uranium oxide in the form of triuranium octaoxide $U_3O_8$, optionally plutonium oxide and at least one oxide of a minor actinide.

These powders may stem from oxalic co-precipitation of a flow comprising the relevant chemical elements.

This second alternative gives the possibility of contemplating the direct use of the reprocessing flows comprising the adequate chemical elements with view to manufacturing the fuel of the invention.

The second mixture of powders of the second alternative (i.e. the one comprising inter alia uranium oxide in the form of triuranium octaoxide $U_3O_8$) may be obtained from a fraction of the first co-precipitated powder, which fraction is subject to a calcination step in air, so as to transform the uranium oxide $UO_2$ into triuranium octaoxide $U_3O_8$, the resulting product being then optionally subject to a pressing operation, followed by a crushing operation and a sifting operation so as to isolate the powders having a grain size of more than 100 μm, preferably ranging from 100 to 250 μm.

From a practical point of view, during the calcination operation, the $U_3O_8$ formed dissociates in order to form distinct grains of triuranium octaoxide, the orthorhombic form of $U_3O_8$ being incompatible with the cubic form of plutonium oxide and the oxide of a minor actinide present in the co-precipitated powder.

Whether this is for the first alternative or for the second alternative, the powders stemming from the sifting operations (in this case the powders comprising triuranium octaoxide $U_3O_8$) having a grain size of less than 100 μm (i.e. the powder which passes through a sieve having square meshes with a side of 100 μm) may be recovered and subject to the following successive operations:
   a pressing operation at a pressure advantageously greater than 300 MPa;
   a crushing operation;
   at least one sifting operation so as to isolate the powder having a grain size of more than 100 μm, preferably ranging from 100 to 250 μm, said powders being intended to enter the composition of the second mixture of powders.

Whether this is for the first alternative or for the second alternative, the minor actinide content in the mixture of powders of step a) is advantageously comprised in the range ranging up to 40% by mass based on the total mass of the heavy nuclei (i.e. U, Pu, minor actinide(s)).

In the aforementioned cases, the mixing steps may be carried out in an energetic mixer, such as a soft mixer, for example of the Turbula type with an oscillo-rotary movement or a oscillation mixer without any milling ball.

The milling steps may be carried out in any type of milling machine such as for example a ball, attrition, oscillation, planetary movement mill or a gas jet mill.

The sifting steps may be carried out by means of one or more sieves, for example a stainless steel sieve, allowing isolation of powder having a grain size of more than 100 μm, preferably a grain size ranging from 100 to 250 μm.

The pressing steps may be carried out by means of a press, for example a hydraulic press.

The method of the invention then comprises a step for compacting the aforementioned mixture a) by pressing it in order to give the mixture the shape of a pellet, which will be the shape of the nuclear fuel pellets. This pressing step may be carried out at a pressure P2 equal to, less than or greater than the aforementioned pressure P1.

The resulting pellets are subject to a reduction step during which all or part of the triuranium octaoxide $U_3O_8$ is reduced into uranium oxide $UO_2$, thereby concomitantly generating pores resulting from the vacant space left by the aforementioned reduction.

The reduction step may be carried out by subjecting the aforementioned pellets to a reducing gas stream, for example hydrogen, optionally mixed with a neutral gas, such as argon at a temperature ranging from 600 to 1,000° C. for a duration which may range from 1 to 10 hours.

Thus, this may be an argon and hydrogen mixture, the hydrogen being comprised in the mixture at a content which may range up to 5% by volume and optionally comprising water at a content which may range up to 20,000 ppm.

This reduction step as already mentioned above generates a reduction of $U_3O_8$ into $UO_2$ and thus a reduction in volume. Advantageously, the amount of $U_3O_8$ to be introduced may be determined so that after reduction, the subsequent porosity generates interconnected pores. To do this, one should be above the percolation threshold of the latter and take into account the fact of the volume reduction induced by reduction of $U_3O_8$.

The reduction step may be followed by a sintering step so as to consolidate together the constitutive grains of the pellets.

The sintering step may consist of heating the aforementioned pellets, for example to a temperature ranging from a 1,000 to 1,800° C., for a period which may range from 1 to 8 hours, for example in a neutral gas atmosphere such as argon, optionally in the presence of hydrogen and water or further in a reducing medium comprising hydrogen and optionally a neutral gas such as argon, the hydrogen being comprised in the mixture at a content which may range up to 5% by volume and optionally comprising water at a content which may range up to 20,000 ppm.

After the sintering step, the obtained pellets may be subject to a grinding step, which may be carried out on a centre-less grinder and under dry conditions, in order to obtain pellets meeting the diameter specification.

The fuel obtained by the method according to the invention has the following characteristics:
- fuel having a controlled porosity which may easily be achieved by acting on the introduced amount of triuranium octaoxide $U_3O_8$ and on its grain size;
- fuel, the porosity of which remains stable under irradiation;
- fuel not having any risk of degradation of organic blowing agents as this is the case with fuels including an organic blowing agent;
- fuel which may be stored for a long period.

The invention will now be described relatively to the examples given below as an illustration and not as a limitation.

BRIEF DESCRITPION OF THE DRAWINGS

DETAILED DISCUSSION OF CERTAIN ILLUSTRATIVE EMBODIMENTS

COMPARATIVE EXAMPLE

This example illustrates the preparation of a mixed oxide fuel comprising both uranium and americium.

The method applied according to this example comprises the following steps:
- a step for milling a first mixture by co-milling 10 g of $UO_2/AmO_2$ in a stainless steel bowl comprising two milling balls in an oscillating milling machine for 30 minutes at 15 Hz;
- a step for adding 10 g of $UO_2$ into the first mixture (while observing the U/U+Am=0.9 ratio) in a stainless steel bowl containing two milling balls in an oscillating milling machine for 30 minutes at 15 Hz;
- a step for storing the $UO_2/AmO_2$ mixture in a stainless steel container, this mixture resulting from the addition of 10 g of $UO_2$;
- a step for pressing the resulting $UO_2/AmO_2$ mixture at a pressure P1 of 400 MPa by means of a three-shell matrix with lubrication of the matrix and of the pistons (with stearic acid);
- a reduction step under $Ar/H_2$ at 1,000° C. for 1 hour;
- a natural sintering step under 4% hydrogenated argon at 1,750° C. for 4 hours.

Figure 1:
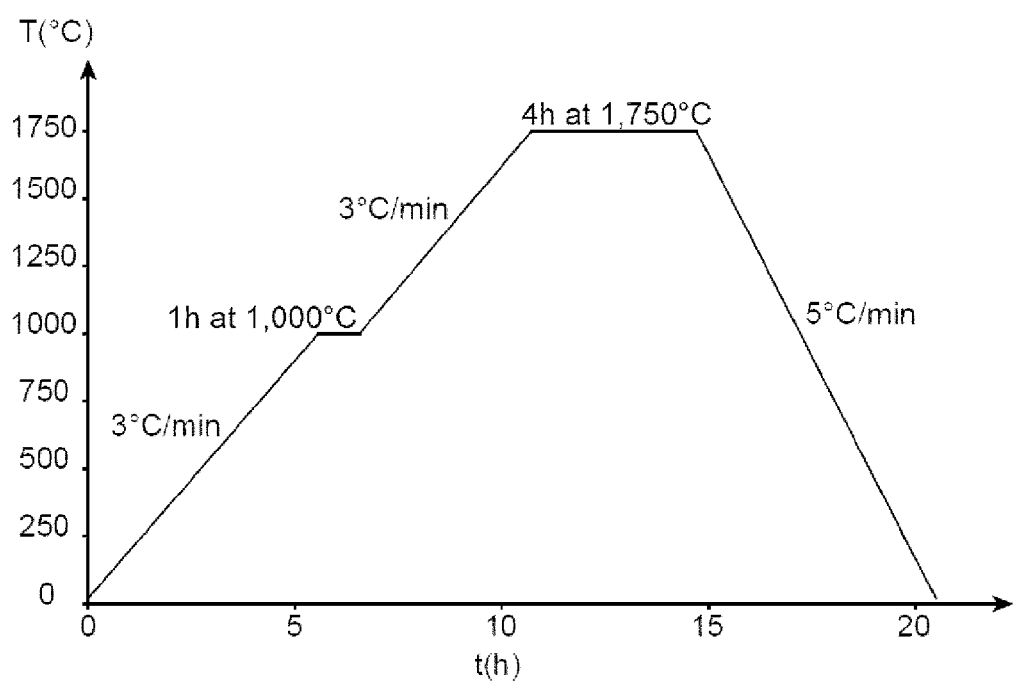
FIG. 1 is a diagram of a heat cycle applied within the scope of Comparative Example 1 and Example 1 of the invention illustrating the change in temperature (in ° C.) versus time t (in hours h).

The reduction/sintering heat cycle is shown more explicitly in FIG. 1 illustrating the change in temperature versus time (in hours).

At the end of this example, a pellet of formula $U_{0.9}Am_{0.1}O_{2-x}$ is obtained having a porosity of the order of about 5% (this is a geometrical density) and having an open porosity level much less than 5% as determined by hydrostatic weighing.

The obtained pellet was analyzed by optical microscopy and by X-ray diffraction.

Figure 2:
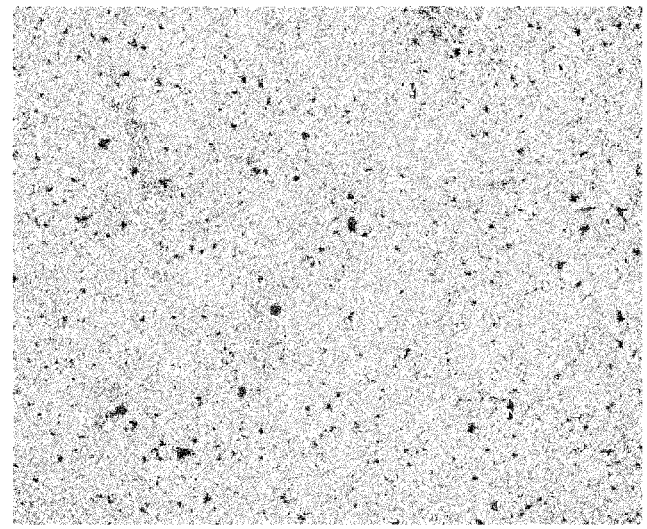
FIG. 2 illustrates a view taken with optical microscopy (magnification *2.5) for the material obtained according to Comparative Example 1.

A photograph obtained by optical microscopy is illustrated in FIG. 2.

On this photograph, it is observed that the material has a very low porosity level.

The geometrical density of the material is estimated to have a value of 95% (geometrical density obtained by weighing and by means of a laser profilometer).

The mass loss of the material after the heat treatment is estimated to be 3.5%.

Example 1 of the Invention

This example illustrates the preparation of a mixed oxide fuel comprising both uranium and americium according to the method of the invention.

The method applied according to this example comprises the following steps:
- a step for preparing a first mixture by co-milling 10 g of $UO_2/AmO_2$ (according to a U/U+Am=0.9 ratio) in a stainless bowl comprising two milling balls in an oscillating milling machine for 30 minutes at 15 Hz;
- a step for preparing a second mixture $U_3O_8/AmO_2$ with a mass of 10 g while observing the U/U+Am=0.9 ratio in a stainless steel bowl containing two milling balls in an oscillating milling machine for 30 minutes at 15 Hz.

$U_3O_8$ is introduced in an amount of 40% by mass based on the mass of the final mixture;

a step for storing the first mixture $UO_2/AmO_2$ in a stainless steel container;

in parallel, a step for pressing the second mixture $U_3O_8/AmO_2$ at a pressure P1 of 400 MPa by means of a three-shell matrix with lubrication of the matrix and of the pistons (with stearic acid);

a step for crushing the pellets stemming from the pressing of the $U_3O_8/AmO_2$ mixture;

a step for sifting the $U_3O_8/AmO_2$ mixture, so as to isolate the grain size fraction having a grain size ranging from 100 to 250 μm, said constitutive grains of said fraction comprising the $U_3O_8/AmO_2$ association within each grain;

a step for mixing (without any milling means in an oscillating milling machine at 15 Hz for 30 minutes) the first $UO_2/AmO_2$ mixture and for sampling the second thereby sifted $U_3O_8/AmO_2$ mixture, so as to guarantee 45% by mass of $U_3O_8$ in the final mixture;

a step for pressing the resulting mixture at a pressure P2 of 400 MPa;

a reduction step under $Ar/H_2$ at 1,000° C. for 1 hour so as to reduce $U_3O_8$ into $UO_2$;

a natural sintering step under 4% hydrogenated argon at 1,750° C. for 4 hours.

The reduction/sintering heat cycle is illustrated more explicitly in FIG. 1 illustrating the change in temperature versus time (in hours).

At the end of this example, a pellet of formula $U_{0.9}Am_{0.1}O_{2-x}$ is obtained having a porosity of about 14% (this is a geometrical density) and having 10% of open porosity as determined by hydrostatic weighing.

The obtained pellet was analyzed by optical microscopy and by X-ray diffraction.

Figure 3:
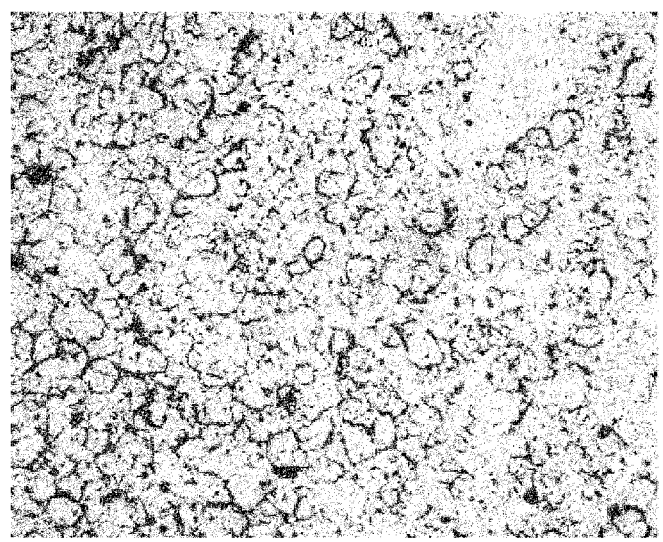
FIG. 3 illustrates a view taken with optical microscopy (magnification *2.5) for the material obtained according to Example 1 of the invention.

A photograph obtained by optical microscopy is illustrated in FIG. 3.

It is observed on this photograph that the porosity of the obtained material has an elongated morphology of the lenticular type and that it is in majority interconnected.

The geometrical density of the material is estimated to have a value of 86% (geometrical density obtained by weighing and by means of a laser profilometer).

The mass loss of the material after the heat treatment is estimated to be 5%.

By X-ray analysis, a disappearance of the $U_3O_8$ phase may be observed after heat treatment (which expresses complete reduction of $U_3O_8$ into $UO_2$). Further, the O/Am ratio of the americium oxide is located in the interval 1.5<O/Am<2, since no $Am_2O_3$ or $AmO_2$ peak was observed. This also expresses the fact that the material is single-phase material (which means that americium and uranium are mixed at an atomic scale).

What is claimed is:

1. A method for manufacturing a porous fuel comprising uranium, optionally plutonium and at least one minor actinide successively comprising:
   a) compacting as pellets a mixture of powders comprising uranium oxide, optionally plutonium oxide and at least one oxide of a minor actinide, at least one portion of the uranium oxide being in a form of triuranium octaoxide $U_3O_8$, the other portion being in a form of uranium dioxide $UO_2$; and
   b) reducing at least one portion of the triuranium octaoxide $U_3O_8$ into uranium dioxide $UO_2$.

2. The manufacturing method according to claim 1, wherein the oxide of a minor actinide is selected from the group consisting of an americium oxide, a curium oxide, a neptunium oxide and mixtures thereof.

3. The manufacturing method according to claim 1, wherein the uranium oxide in the form of triuranium octaoxide $U_3O_8$ is associated within the same grains with an oxide of a minor actinide and optionally with plutonium oxide, said grains having a grain size of more than 100 μm.

4. The method according to claim 1, further comprising before the compacting a), preparing said mixture of powders as defined in a).

5. The method according to claim 4, wherein said preparing the mixture of powders consists of putting into contact a first mixture comprising a powder of uranium oxide in the form of uranium dioxide $UO_2$, optionally a powder of plutonium oxide, and at least one powder of an oxide of a minor actinide and a second mixture of powders comprising uranium oxide in the form of triuranium octaoxide $U_3O_8$, optionally plutonium oxide and an oxide of a minor actinide.

6. The method according to claim 5, wherein the second mixture of powders appears as grains comprising the association within a same grain of uranium oxide in the form of triuranium octaoxide $U_3O_8$, of optionally plutonium oxide, and of an oxide of a minor actinide, said grains having a grain size of more than 100 μm.

7. The method according to claim 5, wherein the first mixture stems from the following operations:
   an operation for putting into contact a powder of uranium oxide in a form of uranium dioxide $UO_2$, optionally a powder of plutonium oxide, and at least one powder of a minor actinide oxide; and
   optionally an operation for co-milling the resulting mixture in order to obtain an intimate mixture of powders.

8. The method according to claim 6, wherein the second mixture of powders stems from the following operations:
   an operation for putting into contact a powder of uranium oxide in a form triuranium octaoxide $U_3O_8$, optionally a powder of plutonium oxide, and at least one powder of an oxide of a minor actinide;
   an operation for co-milling said powders;
   a pressing operation at a predetermined pressure P1;
   a crushing operation; and
   at least one sifting operation so as to isolate the grains having a grain size of more than 100 μm.

9. The method according to claim 4, wherein said preparing the mixture of powders consists of putting into contact a first co-precipitated powder of an oxide of uranium optionally plutonium, and of a minor actinide with a second mixture of powders comprising uranium oxide in the form of triuranium octaoxide $U_3O_8$, optionally plutonium oxide and at least one oxide of a minor actinide.

10. The method according to claim 9, wherein the second mixture of powders is obtained from a fraction of the first co-precipitated powder, said fraction is subject to a calcination step in air so as to transform the uranium oxide $UO_2$ into triuranium octaoxide $U_3O_8$, the resulting product being then optionally subject to a pressing operation, followed by a crushing operation and a sifting operation so as to isolate the powders having a grain size of more than 100 μm.

11. The method according to claim 8, wherein the powders stemming from the sifting operations having a grain size of less than 100 μm are recovered and subject to the following successive operations:
   a pressing operation at a pressure advantageously greater than 300 MPa;
   a crushing operation;
   at least one sifting operation so as to isolate the powder having a grain size of more than 100 μm, said powders being intended to enter the composition of the second mixture of powders.

12. The method according to claim 1, wherein the reduction is applied by having a reducing gas stream pass at a temperature ranging from 600 to 1,000° C. for a period which may range from 1 to 10 hours.

13. The method according to claim 1, further comprising after the reduction, sintering fuel pellets.

14. The method according to claim 13, wherein the sintering is applied by heating the aforementioned pellets to a temperature ranging from 1,000 to 1,800° C., for a period which may range from 1 to 8 hours.

15. The method according to claim 14, wherein the sintering is carried out in a neutral gas atmosphere, optionally in the presence of hydrogen and water.

16. The manufacturing method according to claim 3, wherein said grains have a grain size ranging from 100 to 250 μm.

17. The method according to claim 6, wherein said grains have a grain size ranging from 100 to 250 μm.

18. The method according to claim 8, wherein in said at least one sifting operation, the isolated power has a grain size ranging from 100 to 250 μm.

19. The method according to claim 10, wherein said grains have a grain size ranging from 100 to 250 μm.

20. The method according to claim 11, wherein in said at least one sifting operation, the isolated power has a grain size ranging from 100 to 250 μm.

\* \* \* \* \*